United States Patent
Ahola et al.

(10) Patent No.: US 9,382,903 B2
(45) Date of Patent: Jul. 5, 2016

(54) METHOD AND APPARATUS FOR OPTIMIZING ENERGY EFFICIENCY OF PUMPING SYSTEM

(71) Applicant: ABB Oy, Helsinki (FI)

(72) Inventors: Jero Ahola, Lappeenranta (FI); Tero Ahonen, Lappeenranta (FI); Jussi Tamminen, Lappeenranta (FI)

(73) Assignee: ABB OY, Helsinki (FI)

( * ) Notice: Subject to any disclaimer, the term of this patent is extended or adjusted under 35 U.S.C. 154(b) by 546 days.

(21) Appl. No.: 13/728,319

(22) Filed: Dec. 27, 2012

(65) Prior Publication Data

US 2013/0164146 A1    Jun. 27, 2013

(30) Foreign Application Priority Data

Dec. 27, 2011  (EP) .................................... 11195777

(51) Int. Cl.
| | |
|---|---|
| *F04D 15/00* | (2006.01) |
| *F04B 49/00* | (2006.01) |
| *F04D 13/00* | (2006.01) |
| *G05B 13/02* | (2006.01) |

(52) U.S. Cl.
CPC ................ *F04B 49/00* (2013.01); *F04D 13/00* (2013.01); *F04D 15/0066* (2013.01); *G05B 13/02* (2013.01)

(58) Field of Classification Search
CPC ........ F04D 15/00; F04D 27/00; F04D 27/001
USPC .............. 417/53, 572; 700/282; 702/182, 183
See application file for complete search history.

(56) References Cited

U.S. PATENT DOCUMENTS

| | | | |
|---|---|---|---|
| 6,918,307 B2 | 7/2005 | Ohlsson et al. | |
| 2010/0312400 A1* | 12/2010 | Steffensen | ................... 700/282 |
| 2011/0081255 A1 | 4/2011 | Steger et al. | |
| 2011/0139407 A1 | 6/2011 | Ohler et al. | |
| 2011/0200454 A1* | 8/2011 | Ahonen et al. | ................... 417/45 |

FOREIGN PATENT DOCUMENTS

| | | |
|---|---|---|
| CN | 201758362 U | 3/2011 |
| CN | 102052564 A | 5/2011 |
| EP | 2 157 317 A2 | 2/2010 |
| EP | 2354556 A1 | 8/2011 |

OTHER PUBLICATIONS

*European Search Report issued Jun. 25, 2012 for European Application No. 11195777.
*ABB ACS800 Pump Application Program, pp. 1-236.

(Continued)

*Primary Examiner* — Patrick Hamo
(74) *Attorney, Agent, or Firm* — Buchanan Ingersoll & Rooney PC

(57) ABSTRACT

A method and apparatus for optimizing energy efficiency of a pumping system includes at least one pump that controls a fluid level in a reservoir. The method includes a system identification stage and an energy efficiency optimization stage. The system identification stage includes determining pump characteristics for the pump, operating the pump with a range of flow rate conditions, determining a set of data points, and calculating energy efficiency optimization characteristics. The energy efficiency optimization stage includes determining a present static head value, choosing a value for a pump control parameter, and operating the pump on the pump control parameter.

18 Claims, 6 Drawing Sheets

(56) References Cited

OTHER PUBLICATIONS

*Tero Ahonen et al., Estimation of pump operational state with model-based methods, Energy Conversion and Management 51, Jun. 2010, pp. 1319-1325.
*Tero Ahonen et al., Frequency-Converter-Based Hybrid Estimation Method for the Centrifugal Pump Operational State, IEEE Transactions of Industrial Electronics, vol. 59, No. 12, Dec. 2012, pp. 4803-4809.
Office Action/Search Report dated Nov. 3, 2014, issued by the Chinese Patent Office in corresponding Chinese Patent Application No. 201210576636.1 and an English translation of Office Action/Search Report. (13 pages).

* cited by examiner

METHOD AND APPARATUS FOR OPTIMIZING ENERGY EFFICIENCY OF PUMPING SYSTEM

RELATED APPLICATION(S)

This application claims priority under 35 U.S.C. §119 to European Patent Application No. 11195777.5 filed in Europe on Dec. 27, 2011, the entire content of which is hereby incorporated by reference in its entirety.

FIELD

The present disclosure relates to pumps that control fluid level in a reservoir, and for example, to optimizing the energy efficiency of a pumping process.

BACKGROUND INFORMATION

Pumps are widely used in industrial and municipal applications. A known application for a pump is filling or emptying a reservoir, such as a water tank, by transferring fluid according to requirements set for the pumping process. Such an application can operate on the basis of sensing two surface levels: a high surface level and a low surface level.

For example, in a wastewater storage system, a pump can be started when the high surface level of the reservoir is reached and, correspondingly, the pump can be stopped at the low surface level. Fullness or emptiness of the reservoir can be detected by external low- and high-level sensors installed into the reservoir. Fixed-speed pumps can be used in such applications.

The energy efficiency of such applications can, however, be poor. The fixed-speed pump can be oversized for safety reasons. This can increase the energy consumption of the pumping task unnecessarily. It can be difficult to avoid over-dimensioning when trying to comply with safety requirements for the pumping process. Further, a static head of the pumping process can change during the pumping task. For the above reasons, it can be difficult to achieve minimal energy consumption with a fixed-speed operation of a pumping system.

The energy efficiency can be improved, for example, by optimizing the pumping process and/or the pumping system components. The energy efficiency can also be improved by using an energy-efficient control of the pump operation, for example, by using a variable-speed drive.

U.S. Patent Application Publication No. U.S. 2010/0312400 A1 discloses a method and a system for optimizing energy efficiency of a pump arrangement. In the publication, the energy efficiency of the pumping operation is quantified with the term "energy consumption" representing a required amount of energy (or power) to transfer a unit volume of the fluid (this term is also known as the specific energy consumption, $E_s$, in the literature). The method tries to find a rotational speed at which the resulting energy consumption of a pumping system is minimal. The method and system disclosed utilize a permanent or a temporarily installed flow sensor, which is used to determine the energy consumption characteristics of the pump arrangement.

Flow sensors can, however, be expensive and prone to failure. The method disclosed in the U.S. Patent Application Publication No. U.S. 2010/0312400 A1 also does not take into account the effects of changing process parameters, such as the changing static head during pumping, in the selection of the optimum rotational speed. In practice, a change in the system characteristics can have an effect on the energy consumption characteristics of the pump system and the location of the energy consumption minimum.

SUMMARY

A method is disclosed for optimizing energy efficiency of a pumping system including at least one pump controlling a fluid level of a reservoir, the method including a system identification stage and an energy efficiency optimization stage, wherein the system identification stage comprises determining pump characteristics for the at least one pump, operating the at least one pump with a range of flow rate conditions, determining a set of data points, wherein a data point in the set contains information on a system head and a flow rate within a range, calculating energy efficiency optimization characteristics on a basis of the pump characteristics and the set of data points, and wherein the energy efficiency optimizing stage is performed after the system identification phase and comprises, determining a present static head value, choosing an energy consumption minimizing value for a pump control parameter on a basis of at least the optimization characteristics and the present static head value, and operating the at least one pump on the pump control parameter.

An apparatus is disclosed for optimizing energy efficiency of a pump system including at least one pump controlling a fluid level of a container, the apparatus comprising, a processor coupled to a memory and configured to perform a system identification stage, wherein the processor is configured to determine pump characteristics for the at least one pump, operate the at least one pump with a range of flow rate conditions, determine a set of data points, wherein a data point in the set contains information on a system head and a flow rate within the range, calculate energy efficiency optimization characteristics on the basis of the pump characteristics and the set of data points, and wherein the processor is configured to perform an energy efficiency optimization stage after the system identification phase, the processor being configured to: determine a present static head value, choose an energy consumption minimizing value for a pump control parameter on the basis of at least the optimization characteristics and the present static head value and operate the at least one pump on the basis of the pump control parameter.

BRIEF DESCRIPTION OF THE DRAWINGS

In the following, exemplary embodiments will be described in greater detail with reference to the attached drawings, in which.

DETAILED DESCRIPTION

Figure 1A:
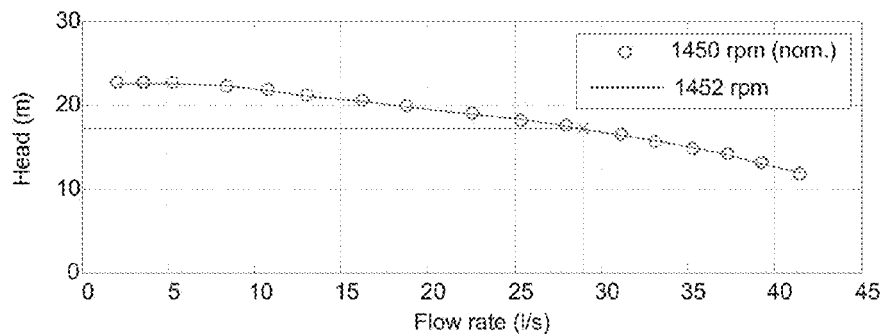
FIGS. 1a and 1b illustrate an example of pump characteristics.

The energy efficiency of a fixed-speed pumping system can be improved by using the methods according to exemplary embodiments of the disclosure. In addition, the methods according to exemplary embodiments of the disclosure can be used to improve the operation and energy efficiency of variable-speed-driven pumping systems already equipped with a frequency converter.

In a method according to an exemplary embodiment of the disclosure, the pumping process is first identified. On the basis of the identified process, energy efficiency optimization characteristics can be formed. The pumping system optimization characteristics can, for example, be represented by the specific energy consumption of the pumping system as a function of the rotational speed of the pump and the static head of the pumping system. In the following paragraphs, the term "static head" can be used for the system static head that the pump needs to overcome to provide flow.

The optimization characteristics can then be used to minimize energy consumption, for example, by adjusting the rotational speed of the pump on the basis of the present static head. The method can, for example, be used to compensate possible over-sizing of the pump. Further, the method can be used to adapt the rotational speed of the pump to the changing static head.

By using the method according to an exemplary embodiment of the disclosure, the pumping process identification can be performed without any extra sensors, such as flow rate or pressure difference sensors. Thus, the implementation of the method according to an exemplary embodiment of the disclosure can only require installation of a frequency converter or, alternatively, installation of a new firmware into the frequency converter, if it already controls the pumping system operation. Other changes in the pump system are not necessarily required. Both the system identification and rotational speed optimization can be fully automatic operations.

The energy efficiency of a fixed- or variable-speed pumping system can be improved by using a method capable of adapting to different system characteristics and operating conditions. A method for the optimizing energy efficiency of a pumping system that includes at least one pump controlling a fluid level of a reservoir is disclosed in the following paragraphs. The method according to an exemplary embodiment of the disclosure can compensate for possible over-dimensioning of the pump. It can also adapt the operation of the pump to the changing static head, for example, during the filling up or emptying a reservoir.

Apart from adding a frequency converter for controlling the pump, the utilization of the method according to an exemplary embodiment of the disclosure does not necessarily require any other major modifications to the existing traditional fixed-speed system. If the operation of the pumping system is already controlled by a frequency converter, updating the firmware of the frequency converter can be enough.

Both the system identification and rotational speed optimization can be fully automatic operations.

The method according to an exemplary embodiment of the disclosure includes two stages: a system identification stage and an energy efficiency optimization stage. The pumping process is first identified in the system identification stage. The system identification stage can be a modified version of the method disclosed in European patent application EP 2 354 556 A1 and T. Ahonen, J. Tamminen, J. Ahola, and J. Kestilä, "Frequency-Converter-Based Hybrid Estimation Method for the Centrifugal Pump Operational State", in IEEE Transactions on Industrial Electronics, Published in IEEE Xplore on Nov. 18, 2011.

The pumping process can be identified, for example, by determining pump characteristics for the pump, operating the pump with a range of flow rate conditions, and determining a set of data points, wherein a data point in the set contains information on the system head and the flow rate within the range. Pump characteristics can be found in the data sheet of the pump published by the manufacturer.

On the basis of the pump characteristics and the set of data points, energy efficiency optimization characteristics can be calculated. The optimization characteristics can, for example, be represented by the specific energy consumption as a function of rotational speed and static head.

After the system identification phase, the energy efficiency optimization stage can be performed. At this stage, the optimization characteristics can be used to minimize energy consumption by adjusting a pump control parameter, such as rotational speed or torque, of the pump on the basis of the static head.

The present static head can, for example, be determined on the basis of a present system head value. Then, a value for the pump control parameter minimizing the energy consumption can be chosen on the basis of at least the optimization characteristics and the present static head value.

The pump can be operated on the basis of the pump control parameter. A frequency converter can, for example, control the pump on the basis of a chosen rotational speed.

Figure 1B:
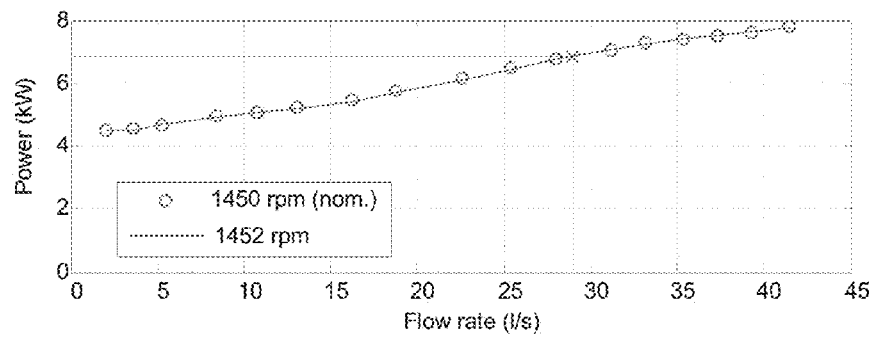

The pump characteristics and general performance of a pump can be presented by characteristics curves for the head H, shaft power consumption P and efficiency $\eta$ as a function of the flow rate Q at a constant rotational speed $n_0$. FIGS. 1a and 1b illustrate an example of pump characteristics. FIG. 1a shows a pump QH characteristics curve where the total head of a pump at a nominal rotational speed is represented as a function of flow rate. FIG. 1b shows a pump QP characteristics curve where the pump shaft power consumption at a nominal rotational speed is represented as a function of flow rate.

Because a frequency-converter-driven pump can be operated at various rotational speeds, it can be necessary to convert the pump characteristics curves into the instantaneous rotational speed. This can be performed with affinity laws:

$$Q = \frac{n}{n_0} Q_0, \tag{1}$$

$$H = \left(\frac{n}{n_0}\right)^2 H_0, \tag{2}$$

and $$P = \left(\frac{n}{n_0}\right)^3 P_0, \tag{3}$$

where Q is the flow rate, H is the pump head, P is the pump shaft power consumption, n is the rotational speed, and the subscript $_0$ denotes the initial values given, for example, in the published characteristics curves. These pump QH and QP characteristics curves with the related speed $n_0$ can, for example, be stored in the frequency converter as the pump characteristics.

In order to minimize energy consumption, energy efficiency optimization characteristics can be calculated on the basis of the pump characteristics and a set of data points describing system characteristics of the pumping system in question.

System characteristics of a pumping system can also depend on other parts of the pumping system, such as reservoirs and piping. The system characteristics of the pumping system can be described by a curve representing the effect of a vertical fluid lift requirement set for the pump (e.g., static head $H_{st}$), and the effect of flow-rate-dependent flow losses (e.g., dynamic head $H_{dyn}$) on the system head.

The static head $H_{st}$ is a term for a vertical fluid lift requirement that can, for example, include a vertical distance between fluid levels of two reservoirs in the pumping system and possibly an ambient pressure difference between the start and end points of the fluid flow.

The dynamic head $H_{dyn}$ describes the effect of flow-rate-dependent flow losses on the system head. With Newtonian liquids, the dynamic head has a squared relationship with the flow rate Q of the pump, which is often described using the variable k for flow losses.

Thus, the calculated system characteristics can describe the head requirement set for a pump as a function of flow rate. This requirement is later referred to as the system head $H_{sys}$, and it can be calculated as follows:

$$H_{sys} = H_{st} + H_{dyn}, \quad (4)$$

wherein $$H_{dyn} = k \cdot Q^2. \quad (5)$$

A two-reservoir pumping system that includes a pump and an interconnecting piping connecting the reservoirs can be regarded as a pumping process. In the process of filling or emptying a reservoir, fluid level of at least one of the reservoirs is changed by transferring the fluid according to the process requirements.

In this case, the system characteristics curve can represent the effect of the vertical distance between the fluid levels of the two reservoirs and the effect of flow-rate-dependent flow losses in the piping on the system head. As fluid is transferred from one reservoir to another, fluid levels can change resulting in a change in static head. Consequently, this can affect the energy efficiency optimization characteristics of a pumping system during the process of filling or emptying a reservoir.

Because the system characteristics are seldom precisely known, calculating energy efficiency optimization characteristics can include calculating the system characteristics. In order to determine the system characteristics, the pump can be operated with a range of flow rate conditions. While operating the pump within a range of conditions, a set of data points can be gathered. The flow rate of the pump can, for example, be ramped up at startup in the system identification stage in order to scan through a sufficient amount of different flow rate conditions. The data points can, for example, contain information on the system head and a flow rate within the range. This information can, in some cases, be directly obtainable from sensors, such as pressure and flow sensors.

Alternatively, it is possible to estimate the flow rate and the head. Pump characteristics curves make possible the sensorless estimation of the pump operating point location and efficiency. For example, determining the set of data points can include first determining a rotational speed and a torque of a pump. Estimates of the rotational speed and shaft torque can be available from a frequency converter. The power of the pump can then be determined on the basis of the rotational speed and the torque. Estimated pump power $P_{est}$ can be, for example, determined on the basis of the estimated rotational speed $n_{est}$ (in rpm) and the estimated shaft torque $T_{est}$:

$$P_{est} = \frac{\pi}{30} n_{est} T_{est} \quad (6)$$

The flow rate and/or the system head can be determined on the basis of the pump power, pump characteristics, and rotational speed.

For example, the pump shaft power can first be determined by using Equation 6. The flow rate can then be determined with the estimated pump power, pump QP characteristics curve, the estimated rotational speed, and affinity laws. For example, the flow rate produced by the pump can be determined from FIG. 1b, when the pump shaft power is known. The system head can, for example, be then determined on the basis of the flow rate, pump QH characteristics curve, rotational speed, and affinity laws. The model-based estimation method for the pump operating location is known from, for example, B. Ohlsson, U. Windecker, S. Zahrai, U.S. Pat. No. 6,918,307 B2 and T. Ahonen, J. Tamminen, J. Ahola, J. Viholainen, N. Aranto, and J. Kestilä, "Estimation of Pump Operational State With Model-Based Methods", in Energy Conversion and Management Journal, June 2010.

Alternatively, the operation point of the pump can be estimated by utilizing a pressure measurement and the pump characteristics curves. The estimation procedure is almost identical to that illustrated in FIG. 1b but the flow rate is instead estimated using the measured head and a given QH curve (see FIG. 1a). The QH-curve-based method is already used in frequency converters. See T. Ahonen, J. Tamminen, J. Ahola, J. Viholainen, N. Aranto, and J. Kestilä, "Estimation of Pump Operational State With Model-Based Methods", in Energy Conversion and Management Journal, June 2010 and ABB ACS800 Pump Application Program.

On the basis of the pump characteristics and system characteristics, the energy efficiency optimization characteristics of the pump can then be calculated. The energy efficiency optimization characteristics can, for example, be represented by the energy consumption per transferred fluid volume, e.g., the specific energy consumption, as a function of the static head and rotational speed of the pump.

After the system identification stage is completed, the energy efficiency optimization stage can be performed. During the energy efficiency optimization stage, the energy consumption can be automatically optimized and monitored. The energy efficiency optimization stage includes choosing a value for a pump control parameter in order to achieve minimum energy consumption. The pump control parameter in the energy efficiency optimization stage can, for example, be the rotational speed or torque of the pump. The pump control parameter can, for example, be chosen on the basis of at least the optimization characteristics and the present static head value. The present static head value can be determined, for example, in a similar manner as the value of the static head during the system identification stage.

The pump can be operated on the basis of the pump control parameter, thus minimizing the energy consumption.

Figure 2A:
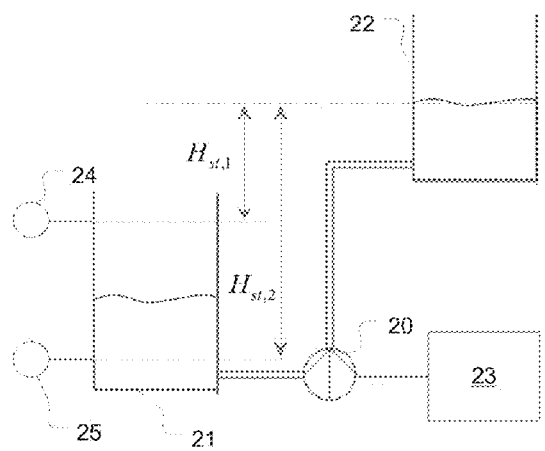
FIGS. 2a and 2b illustrate an exemplary embodiment of the disclosure for emptying a reservoir.
Figure 2B:
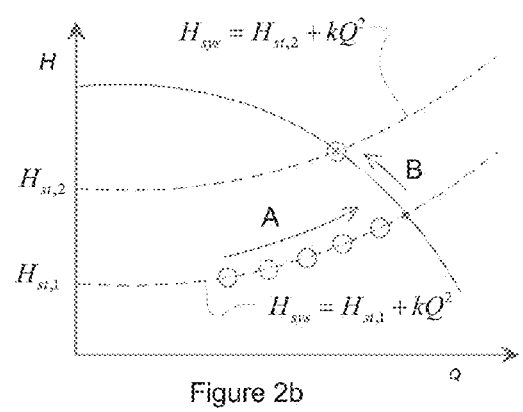

FIGS. 2a and 2b illustrate an exemplary embodiment for emptying a reservoir, in which a pump is started when the fluid level rises to a high limit, and the pump is stopped when the fluid level reaches a low limit.

FIG. 2a shows the pumping system, where a pump 20 is used to pump fluid from a lower reservoir 21 to an upper reservoir 22. The fluid level in the upper reservoir 22 is assumed to remain constant. In other words, the pump 20 controls the fluid level of the lower reservoir. A frequency converter 23 operates the pump 20 in the disclosed method. The static head of the system increases when the lower reservoir is being emptied. This results in a change in the most energy efficient rotational speed. The frequency converter 23 is then used to optimize energy-efficiency of the pumping system.

The assumption that the fluid level in the upper reservoir 22 remains constant simplifies the determination of the system characteristics, as the static head $H_{st}$ is then only affected by the change of the fluid level in the lower reservoir. The static head $H_{st}$ changes within the range $H_{st,1} \ldots H_{st,2}$.

However, the disclosed method is also applicable to other reservoir systems, if the system has a typical operating range $H_{st,1} \ldots H_{st,2}$ for the static head $H_{st}$. In order to utilize Equations 4 and 5, the variable k should also remain constant during the operation of the pump system. In FIG. 2a, this means that there should be no flow controlling valves in the pumping system, or the existing valves should not vary k during normal pumping system operation.

FIG. 2b shows the system characteristics curves at the upper and lower limits of the static head (dashed lines identified with $H_{st,2}$ and $H_{st,1}$, respectively). A change in the static head changes the location of the pump operating point (see arrow B), if the pump is driven at a constant rotational speed.

According to a method according to an exemplary embodiment of the disclosure, the process is first identified in the system identification stage. For the system identification stage, pump characteristics are inputted to the frequency converter. The frequency converter also operates the pump within a range of flow rate conditions.

FIG. 2b further illustrates the system identification stage of an exemplary embodiment. The system identification stage is divided into two phases.

In the first phase, the pump 20 is automatically started when the water level reaches a high-level indicator 24. When the startup signal is received, the frequency converter 23 ramps up slowly the flow rate of the pump 20 to the nominal rotational speed of the pump, for example. This is shown as phase A in FIG. 2b. During the first phase, samples of rotational speed and torque estimates ($n_{est,1,i}$, $T_{est,1,i}$) are stored. In FIG. 2b, the samples are represented by circles.

In the second phase (phase B in FIG. 2b) of the system identification stage, the pump 20 is run at constant rotational speed until a low-level indicator 25 (in FIG. 2a) signals that the pump 20 should be stopped. The rotational speed and torque estimates are sampled at the moment when the low-level indicator 25 in FIG. 2a signals the frequency converter 23 to stop pumping.

As estimates of both the rotational speed and the torque are available from the frequency converter 23 in the embodiment, the frequency converter 23 can be used to determine a set of data points during the first and the second phase of the system identification stage. A data point in the set contains information on a system head and a flow rate within the range. Estimates of the flow rate, $Q_{est,i}$, and head, $H_{est,i}$, are formed for each stored data point utilizing, for example, the estimation methods disclosed above. The data points can be saved in the memory of a controller of the frequency converter.

After a sufficient amount of data is gathered, the energy efficiency optimization characteristics can be calculated on the basis of the pump characteristics and the set of data points.

In this embodiment, the frequency converter 23 calculates the energy efficiency optimization characteristics. The energy efficiency optimization characteristics can be calculated on the on the basis of the pump characteristics and system characteristics. The system characteristics represent the limits of the static head ($H_{st,1}$, $H_{st,2}$) and the effect of flow rate on the system head (variable k). The system characteristics can be calculated on the basis of the set of values of flow rate and system head.

During the first phase of the system identification stage, the static head $H_{st}$ is at its lowest level and can be considered to be approximately constant. Thus, system characteristics parameters $H_{st,1}$ and k can be calculated from stored estimates of rotational speed and torque ($n_{est,1,i}$, $T_{est,1,i}$). The calculation can, for example, be accomplished with the use of a least squares and Simplex method, which minimizes the following equation:

$$S = \sum_{i=1}^{n} (H_{est,1i} - H_{st,1} - k \cdot Q_{est,1i}^2)^2. \tag{7}$$

Correspondingly, during the second phase of the system identification stage, the static head $H_{st}$ changes as the surface level of the reservoir drops. When the low surface level is reached, the static head is at its upper limit $H_{st,2}$, thus, having an effect on the location of the pump operating point (now $Q_{est,2}$, $H_{est,2}$). Because the variable k representing flow friction losses is assumed to remain constant, the upper limit $H_{st,2}$ of the static head can be calculated as follows:

$$H_{st,2} = H_{est,2} - kQ_{est,2}^2 \tag{8}$$

As the upper limit $H_{st,2}$ and lower limit $H_{st,1}$ for the static head, together with the variable k representing flow friction are now known, the system characteristics are sufficiently identified for this embodiment to calculate the energy efficiency optimization characteristics.

In the task of energy efficiency optimization of this embodiment, the goal is to minimize the total energy consumption of a pumping task, i.e., the emptying or filling up of a reservoir. The energy efficiency optimization automatically compensates for the excessive energy consumption caused by an over-sized pump. The rotational speed of the pump is also automatically adjusted according to the current static head.

A set of curves representing specific energy consumption $E_s$ as a function of flow rate Q and rotational speed n can be formed for a range of static head values from $H_{st,1}$ to $H_{st,2}$ on the basis of the identified system characteristics. The energy consumption can be calculated as follows:

$$E_s = \frac{P}{\eta_{dt} \cdot Q}, \tag{9}$$

where P is the pump power consumption and $\eta_{dt}$ is the combined efficiency of the motor and frequency converter (i.e., the drive train efficiency). If the drive train efficiency values are not readily available, they can be omitted from the calculations for the sake of simplicity, because the pump efficiency can have a dominant effect on the pumping energy efficiency. The pump power consumption P can be defined by utilizing the pump QP characteristics curve, the system characteristics, and the affinity equations.

Figure 3:
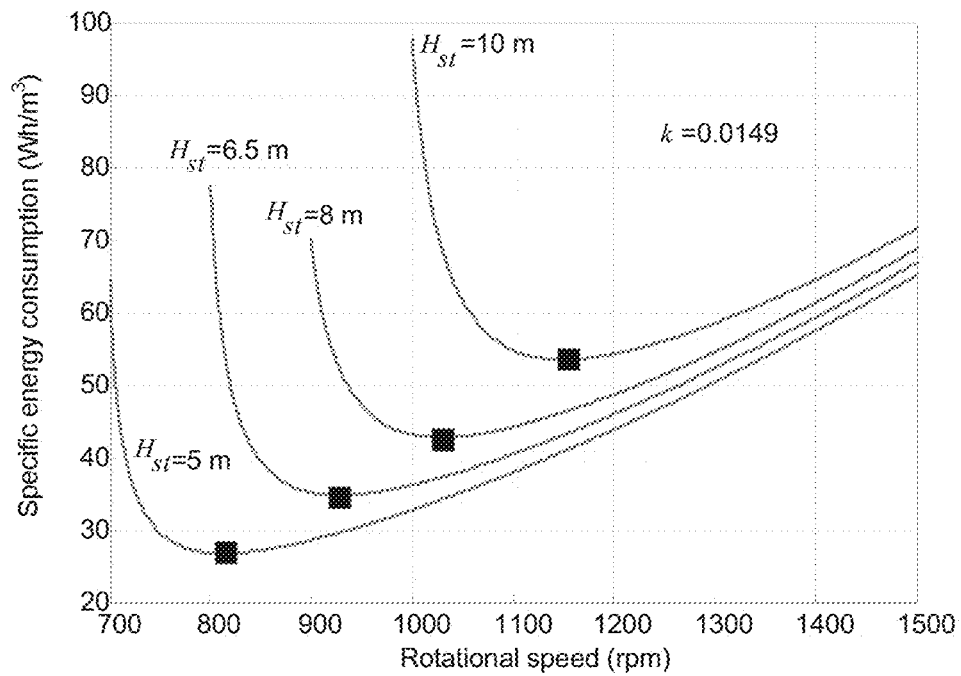
FIG. 3 illustrates simulated specific energy consumption curves.

FIG. 3 illustrates simulated energy efficiency curves calculated for the process which has a static head ranging between $H_{st,1}$=5 m and $H_{st,2}$=10 m. The simulation itself is discussed in more detail later in this disclosure. The curves represent energy efficiency in the form of specific energy consumption (for example in Wh/m$^3$) as a function of rotational speed (in rpm). As shown in FIG. 3, each energy efficiency curve has a single rotational speed that results in the minimum specific energy consumption. Consequently, a table of energy efficiency optimization characteristics can be formed, which contains an energy efficiency optimizing rotational speed, or other control parameter values, for each static head.

After the energy efficiency optimization characteristics have been formed, the system identification stage is finished, and the energy efficiency optimization stage can be performed.

In practice, the user can have given system limits for the minimum and maximum rotational speed. These can be a result, for example, of a minimum allowed flow velocity of the pumped fluid in the piping, a risk of cavitation, or a maximum time available for the emptying (or filling up) of the reservoir. These are taken into account in the selection of the used rotational speed. If an optimal rotational speed $n_{opt}$ is less than a minimum speed allowed, $n_{min}$, the minimum allowed rotational speed $n_{min}$ is selected. Correspondingly, if the optimal rotational $n_{opt}$ speed exceeds a maximum speed $n_{max}$, the maximum rotational speed $n_{max}$ is then selected.

The optimized operation in the energy efficiency optimization stage in the embodiment of FIGS. 2a and 2b is as follows. The high-level indicator 24 signals the startup of the pump 20. The frequency converter 23 starts up, and optimal rotational speed is selected for use on the basis of the minimum static head $H_{st,1}$ and possible constraints (e.g., $n_{min}$ and $n_{max}$).

The frequency converter 23 determines a present static head value $H_{st,i}$ periodically by using the pump QP and QH characteristics curves, affinity equations, and identified k (see Equation 8). The frequency converter 23 then chooses the energy consumption minimizing value for a pump control parameter on the basis of at least the optimization characteristics and the present static head value, and operates the pump on the basis of the pump control parameter. Finally, when the reservoir is empty, the low level indicator 25 signals the pump 20 to stop.

In addition to the conducted rotational speed optimization, the total energy consumption of each pumping task can be calculated and stored by the frequency converter 23. This information, in a form of a trend, can be used to detect changes in operating conditions. For example, in sewage systems, mechanical wear and blocking of the pump impeller or piping system can degrade the pumping energy efficiency, leading to an energy consumption that is higher than in normal conditions. The frequency converter 23 can be used to detect degradation in pump condition and performance on the basis of a comparison between the present energy consumption and stored information.

An implementation of the disclosed method in a reservoir emptying application was simulated using MATLAB software. FIG. 3 illustrates energy efficiency curves determined on the basis of the simulation. The curves represent energy efficiency in the form of the specific energy consumption, which is here represented by the energy consumption per transferred volume of fluid as a function of rotational speed (in rpm).

In the simulation, a pump transferred fluid from a lower reservoir to a higher reservoir, thus resulting in a static head $H_{st}$ starting at 5 meters and eventually finishing at 10 meters. A constant k of the value 0.0149 was used to represent the flow loss factor. In the simulation, the cross-sectional area of the reservoir was 0.75 m², meaning that approximately 3.75 m³ of water was transferred during a single reservoir emptying task. The pump was driven by an induction motor and a frequency converter, whose effect on the resulting specific energy consumption $E_s$ was ignored in the simulations by selecting $\eta_{dt}=1$ for the drive train efficiency (Equation 9).

Figure 4:
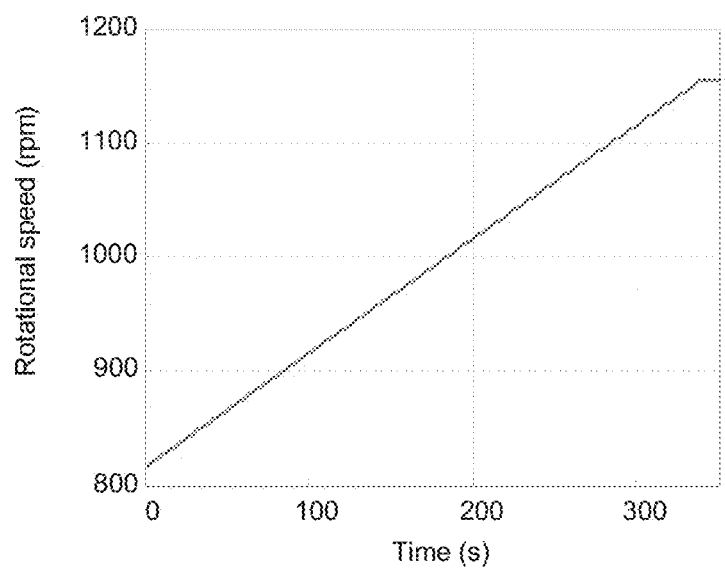
FIG. 4 illustrates a rotational speed ramp profile used in an exemplary embodiment of a method according to the disclosure.

In the simulation, the pump characteristics of a Sulzer APP22-80 centrifugal pump with a 255 mm impeller were used for the pump transferring the fluid to the higher reservoir. Pump characteristics related to the process were such that the pump operated at its best efficiency point (BEP), when the static head $H_{st}$ was 5 meters and the pump was driven at 1450 rpm. The resulting energy efficiency curves indicate that the optimum rotational speed for the pump was between 815 and 1155 rpm during the reservoir emptying. The constant rotational speed simulations were carried out using a set of constant rotational speeds ranging from 1000 to 1450 rpm. In comparison, a simulation with the linear speed ramp based on the static head $H_{st}$ of the system and the table of optimum rotational speeds was also carried out. FIG. 4 illustrates the used rotational speed ramp profile.

Figure 5A:
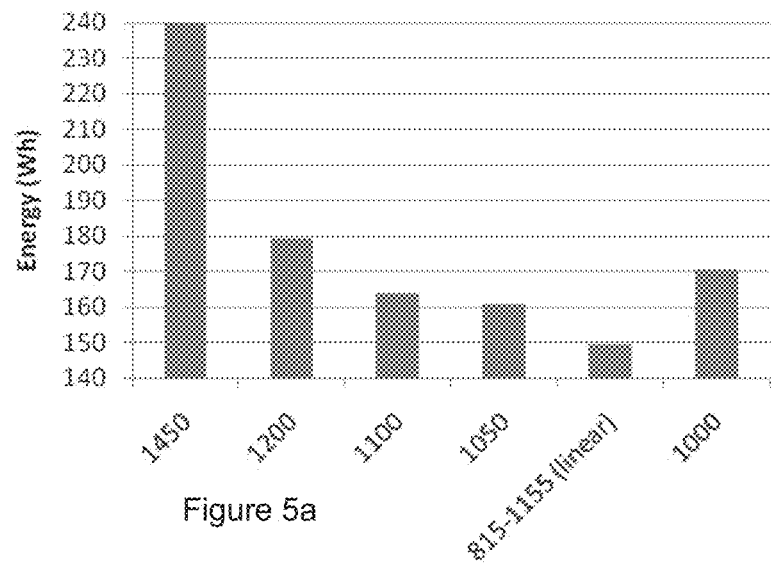
FIGS. 5a and 5b illustrate simulated energy consumptions and durations of an exemplary reservoir-emptying application with a linear ramp speed profile and with a set of constant rotational speeds.
Figure 5B:
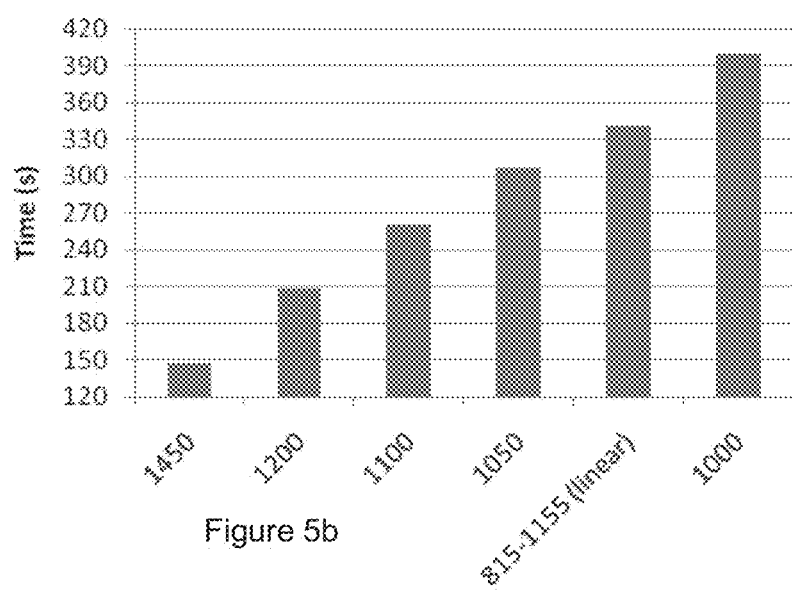

The use of a ramp-shaped rotational speed profile influenced by the static head $H_{st}$ seemed to provide further energy savings in comparison to the use of a constant rotational speed during a single reservoir emptying task. Results in respect of the energy consumption and duration with different rotational speed profiles are introduced in FIGS. 5a and 5b. FIG. 5a illustrates the energy consumptions of the proposed linear ramp speed profile and a set of constant rotational speeds between 1000 and 1450 rpm. FIG. 5b illustrates the durations of a single reservoir emptying task, when using the proposed linear ramp speed profile and a set of constant rotational speeds.

Results clearly indicate that the pump operation at the rotational speed of 1450 rpm was not recommendable in terms of energy efficiency, if the process allowed pump operation at a smaller rotational speed. On the other hand, the rotational speed of the pump had to be high enough so that the pump did not operate in a region with a low efficiency and a small flow rate, because the low efficiency and the small flow rate increased the energy consumption and the duration of emptying the reservoir. An example of high-energy consumption and a long duration can be found at constant rotational speed of 1000 rpm in FIG. 5.

The results also show that the optimum constant (fixed) rotational speed for this application was 1050 rpm where the energy consumption was approximately 161 Wh per emptied reservoir. At this rotational speed, the reservoir was emptied in 307 seconds.

In comparison with the constant rotational speed of 1050 rpm, the use of a linear ramp speed reference decreased the energy consumption by approximately 11 Wh (7%) per emptied reservoir, resulting in an energy consumption of 150 Wh. On the other hand, emptying the reservoir also took longer, 341 seconds.

Figure 6:
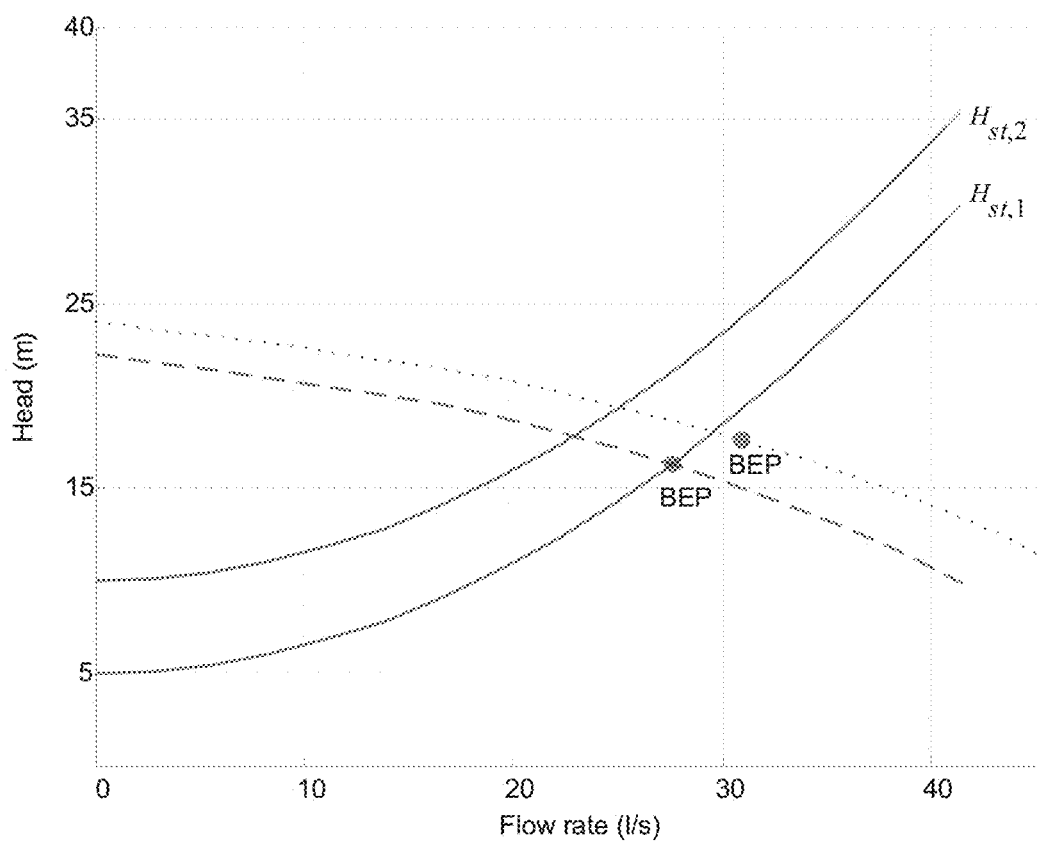
FIG. 6 illustrates system characteristics curves and the effect of pump over-sizing on the operating point locations.

The effect of over-sizing on pump operation, and its compensation by the disclosed method, was studied by using a similar simulation process where a larger impeller with a diameter of 265 mm was used on the pump. Compared with the previous tests, the use of the larger impeller resulted in a 12% increase in the flow rate and an 8% increase in the head produced by the pump. FIG. 6 illustrates system characteristics curves with the minimum and maximum static heads, and the effect of pump over-sizing on the operating point locations, which are at the intersection of the pump and system head curves. The original pump QH characteristics curve is plotted with a dashed line, and the QH curve of the over-sized pump is plotted with a dotted line. Both system characteristics curves (indicated by $H_{st,1}$ and $H_{st,1}$) are plotted with solid lines. FIG. 6 shows how over-sizing moved the pump operating point locations further away from the best efficiency point BEP denoted by a circle.

Figure 7A:
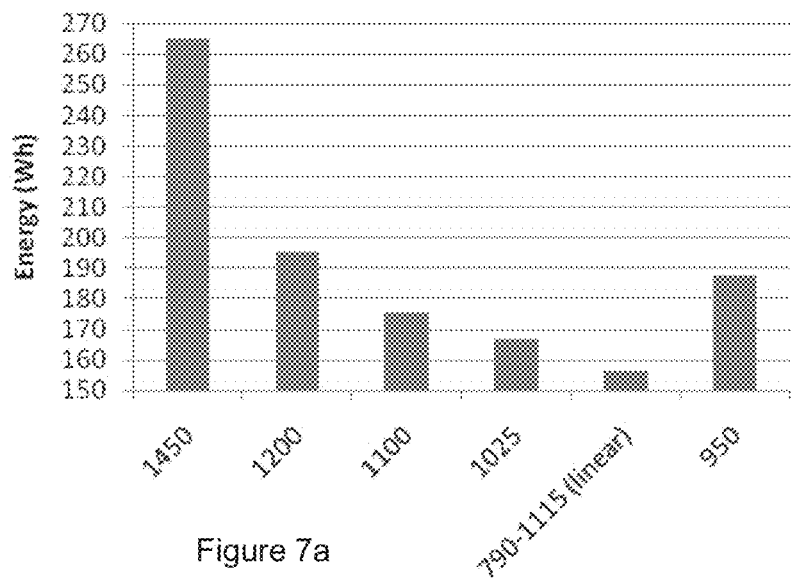
FIGS. 7a and 7b illustrate energy consumption and duration of a single reservoir-emptying application with different rotational speed profiles.
Figure 7B:
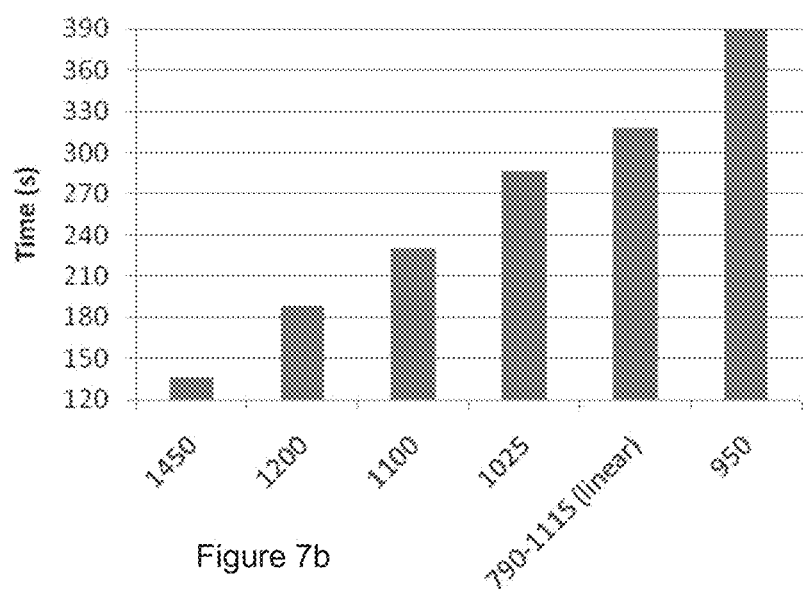

The pump specific energy consumption for different static heads was again determined in order to calculate a table of optimal rotational speeds. The table was used to determine an optimum rotational speed profile for the pump during the reservoir emptying. FIG. 7a illustrates results for the energy consumption of a single reservoir emptying task with different rotational speed profiles. FIG. 7b illustrates results for the duration of a single reservoir emptying task with the same rotational speed profiles.

The results clearly show the benefits of upgrading a fixed-speed and over-sized pump with a frequency converter that allows an energy efficient control of the pump operation. Compared with the results of FIG. 5, energy consumption at 1450 rpm was 265 Wh, being 25 Wh (10%) higher because of the pump over-dimensioning. This difference decreased with a decreasing rotational speed: at optimum constant rotational speed of this system, 1025 rpm, the energy consumption was approximately 167 Wh per emptied reservoir (6 Wh more than in the previous case). At this speed, the reservoir emptied in 286 seconds.

In comparison with the constant rotational speed of 1025 rpm, the use of a linear speed ramp reference ranging from 790 to 1115 rpm decreased the energy consumption by approximately 10 Wh (6%) per emptied reservoir, resulting in an energy consumption of 157 Wh. On the other hand, emptying the reservoir took longer, 318 seconds.

Figure 8A:
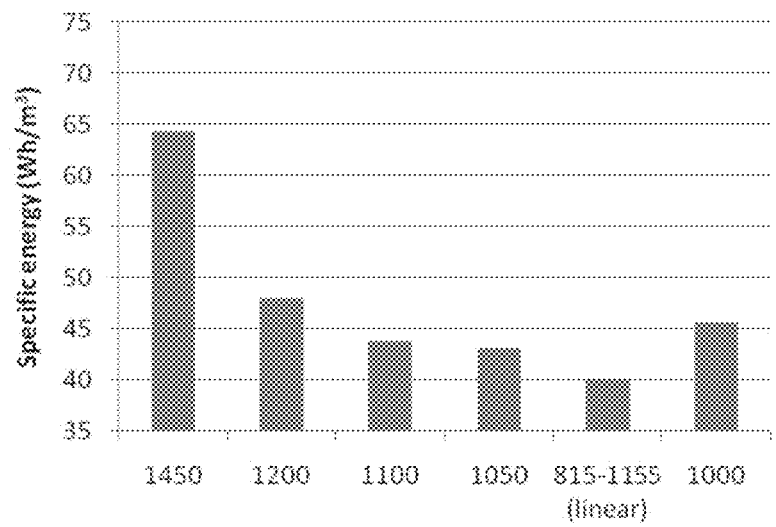
FIGS. 8a and 8b illustrate simulation results represented as specific energy consumption magnitudes with different rotational speed profiles.
Figure 8B:
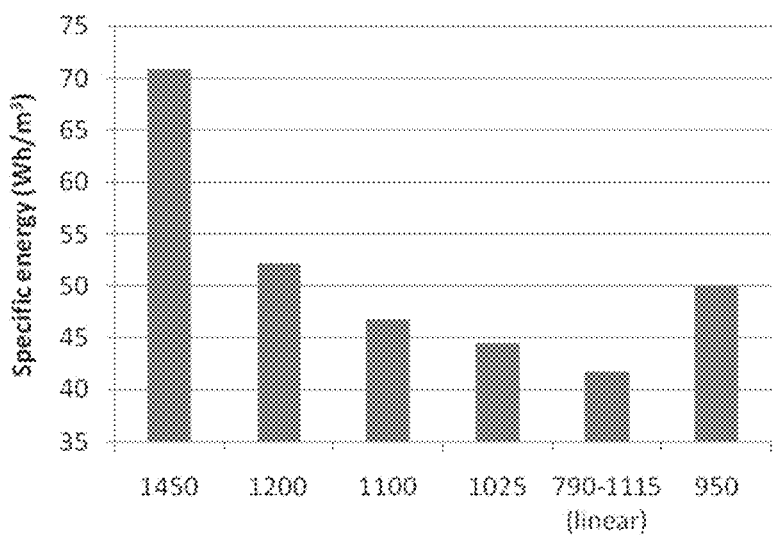

For a better comparison of the results introduced in FIGS. 5 and 7, the results are given as average specific energy consumption magnitudes in FIGS. 8a and 8b. FIG. 8a shows the results for a correctly sized pump. FIG. 8b shows the results for an over-sized pump.

The exemplary embodiments of the present disclosure can be implemented by at least one processor (e.g., general purpose or application specific) of a computer processing device which is configured to execute a computer program code tangibly recorded on a non-transitory computer-readable recording medium, such as a hard disk drive, flash memory, optical memory or any other type of non-volatile memory. Upon executing the program code, the at least one processor is configured to cause the computer processing device to perform the operative functions of the above-described exemplary embodiments.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for optimizing energy efficiency of a pumping system including at least one pump controlling a fluid level of a reservoir, the method including a system identification stage and an energy efficiency optimization stage, wherein the system identification stage comprises:
   determining pump characteristics for the at least one pump;
   operating the at least one pump with a range of flow rate conditions;
   determining a set of data points, wherein a data point in the set contains information on a system head and a flow rate within a range, where the system head is a sum of a static head and a dynamic head, where the static head is a vertical fluid lift requirement set for the pump and the dynamic head is an effect of flow-rate dependent flow losses;
   calculating system characteristics representing effects of the static head and the dynamic head on the system head on the basis of the set of data points;
   calculating energy efficiency optimization characteristics of the at least one pump on a basis of the pump characteristics and the system characteristics; and
   wherein the energy efficiency optimizing stage is performed after the system identification phase and comprises:
   determining a present static head value;
   choosing an energy consumption minimizing value for a pump control parameter on a basis of at least the optimization characteristics and the present static head value; and
   operating the at least one pump on the pump control parameter.

2. The method according to claim 1, wherein the energy efficiency optimization characteristics represent energy consumption per volume transferred by the at least one pump as a function of the present static head value and rotational speed of the pump.

3. The method according to claim 1, wherein determining the set of data points comprises:
   determining a rotational speed and a torque of the at least one pump;
   determining a power of the at least one pump on the basis of the rotational speed and the torque; and
   determining the flow rate on the basis of the power, pump characteristics, and rotational speed.

4. The method according to claim 1, wherein determining the set of data points comprises:
   determining the system head on the basis of the flow rate, pump characteristics, and rotational speed.

5. The method according to claim 3, wherein determining the flow rate comprises:
   determining the flow rate on the basis of the power, pump QP characteristics curve, rotational speed, and affinity laws.

6. The method according to claim 4, wherein determining the system head comprises:
   determining the system head on the basis of the flow rate, pump QH characteristics curve, rotational speed, and affinity laws.

7. The method according to claim 1, wherein the pump control parameter in the energy efficiency optimization stage is the rotational speed of the pump.

8. The method according to claim 1, wherein operating the pump in the system identification stage comprises:
   ramping up the flow rate of the pump at startup.

9. The method according to claim 1, comprising:
   calculating a present energy consumption during a pumping task;
   storing information on the present energy consumption; and
   detecting degradation in pump condition and performance on the basis of comparison between the present energy consumption and stored information.

10. An apparatus for optimizing energy efficiency of a pump system including at least one pump controlling a fluid level of a container, the apparatus comprising:
    a processor coupled to a memory including computer program code, the memory with the computer program code being configured to, with the processor, cause the apparatus to perform a system identification stage, wherein the memory with the computer program code are configured to, with the processor, cause the apparatus to:

determine pump characteristics for the at least one pump;

operate the at least one pump with a range of flow rate conditions;

determine a set of data points, wherein a data point in the set contains information on a system head and a flow rate within the range, where the system head is a sum of a static head and a dynamic head, where the static head is a vertical fluid lift requirement set for the pump and the dynamic head is an effect of flow-rate dependent flow losses;

calculate system characteristics representing effects of the static head and the dynamic head on the system head on the basis of the set of data points;

calculate energy efficiency optimization characteristics of the at least one pump on the basis of the pump characteristics and the system characteristics; and wherein the memory with the computer program code are configured to, with processor cause the apparatus to perform an energy efficiency optimization stage after the system identification phase, wherein the memory with the computer program code are configured to, with the processor, cause the apparatus to:

determine a present static head value;

choose an energy consumption minimizing value for a pump control parameter on the basis of at least the optimization characteristics and the present static head value; and operate the at least one pump on the basis of the pump control parameter.

11. The apparatus according to claim 10, wherein the energy efficiency optimization characteristics represent energy consumption per volume transferred by the at least one pump as a function of the present static head value and rotational speed of the pump.

12. The apparatus according to claim 10, wherein the memory with the computer program code are configured to, with the processor, cause that the apparatus will determine the set of data points by:

determining a rotational speed and a torque of the at least one pump;

determining a power of the at least one pump on the basis of the rotational speed and the torque; and determining the flow rate on the basis of the power, pump characteristics, and rotational speed.

13. The apparatus according to claim 10, wherein the memory with the computer program code are configured to, with the processor, cause that the apparatus will determine the set of data points by:

determining the system head on the basis of the flow rate, pump characteristics, and rotational speed.

14. The apparatus according to claim 12, wherein the memory with the computer program code are configured to, with the processor, cause that the apparatus will determine the flow rate by:

determining the flow rate on the basis of the power, pump QP characteristics curve, rotational speed, and affinity laws.

15. The apparatus according to claim 13, wherein the memory with the computer program code are configured to, with the processor, cause that the apparatus will determine the system head by:

determining the system head on the basis of the flow rate, pump QH characteristics curve, rotational speed, and affinity laws.

16. The apparatus according to claim 10, wherein the pump control parameter in the energy efficiency optimization stage is the rotational speed of the pump.

17. The apparatus according to claim 10, wherein the memory with the computer program code are configured to, with the processor, cause that the apparatus will operate the pump in the system identification stage by:

ramping up the flow rate of the pump at startup.

18. The apparatus according to claim 10, wherein the memory with the computer program code are configured to, with the processor, to cause the apparatus:

calculate a present energy consumption during a pumping task;

store information on the present energy consumption; and detect degradation in pump condition and performance on the basis of comparison between the present energy consumption and stored information.

\* \* \* \* \*